United States Patent [19]

Tsao

[11] Patent Number: 4,696,733

[45] Date of Patent: Sep. 29, 1987

[54] PROCESS FOR SELECTIVELY HYDROGENATING POLYCONDENSED AROMATICS

[75] Inventor: Ying-Yen P. Tsao, Langhorne, Pa.

[73] Assignee: Mobil Oil Corporation, New York, N.Y.

[21] Appl. No.: 651,008

[22] Filed: Sep. 17, 1984

[51] Int. Cl.$^4$ .............................................. C10G 45/00
[52] U.S. Cl. .................................. 208/144; 208/143; 208/145; 208/108; 585/266; 585/268
[58] Field of Search ................. 208/143, 144, 145, 57, 208/56, 107, 108; 585/266, 268

[56] References Cited

U.S. PATENT DOCUMENTS

| | | | |
|---|---|---|---|
| 3,716,479 | 2/1973 | Weisz et al. | 208/251.11 |
| 3,825,486 | 7/1974 | Miale | 208/143 |
| 4,395,324 | 7/1983 | Derbyshire et al. | 208/56 |

*Primary Examiner*—Andrew H. Metz
*Assistant Examiner*—Chung K. Pak
*Attorney, Agent, or Firm*—A. J. McKillop; M. G. Gilman; L. P. Hobbes

[57] ABSTRACT

A process is disclosed for hydrogenating or partially hydrogenating polynuclear aromatics by contacting them with manganese nodules in the presence of hydrogen at elevated temperatures. The resulting partially hydrogenated products are useful as hydrogen donors in processes such as thermal cracking.

12 Claims, 3 Drawing Figures

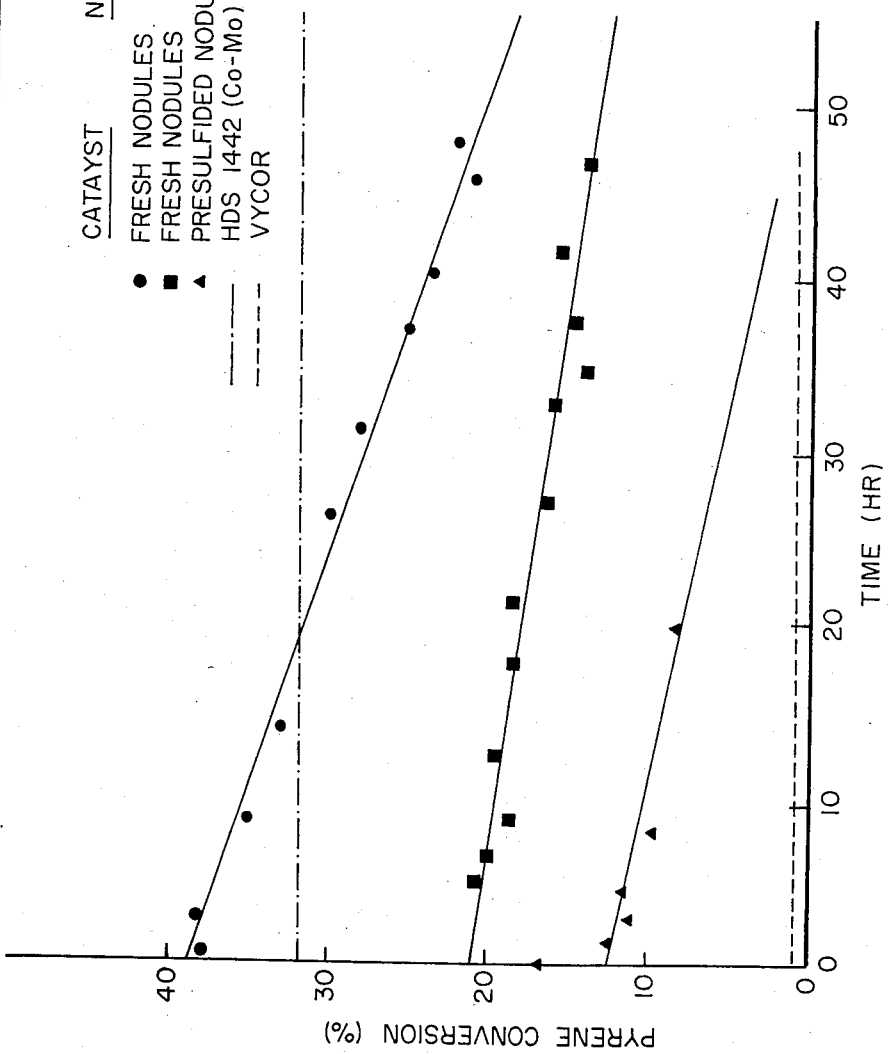

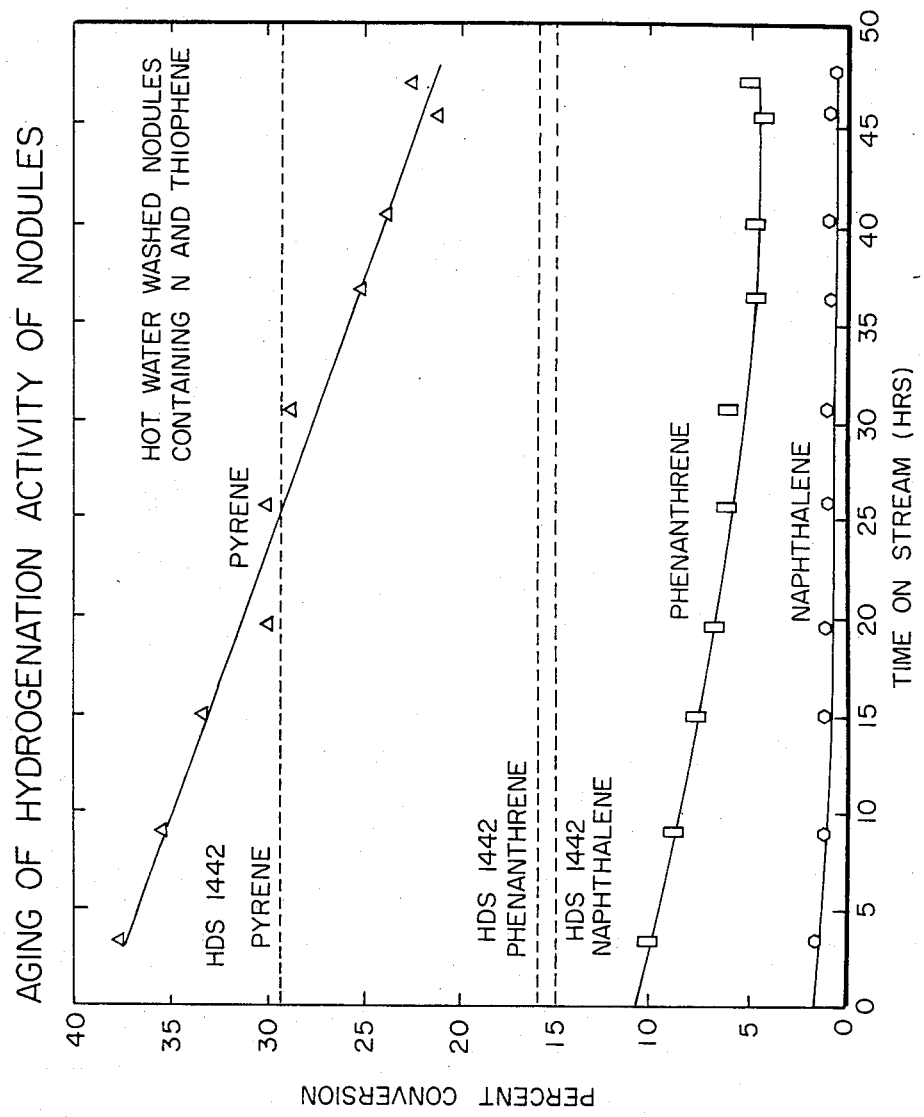

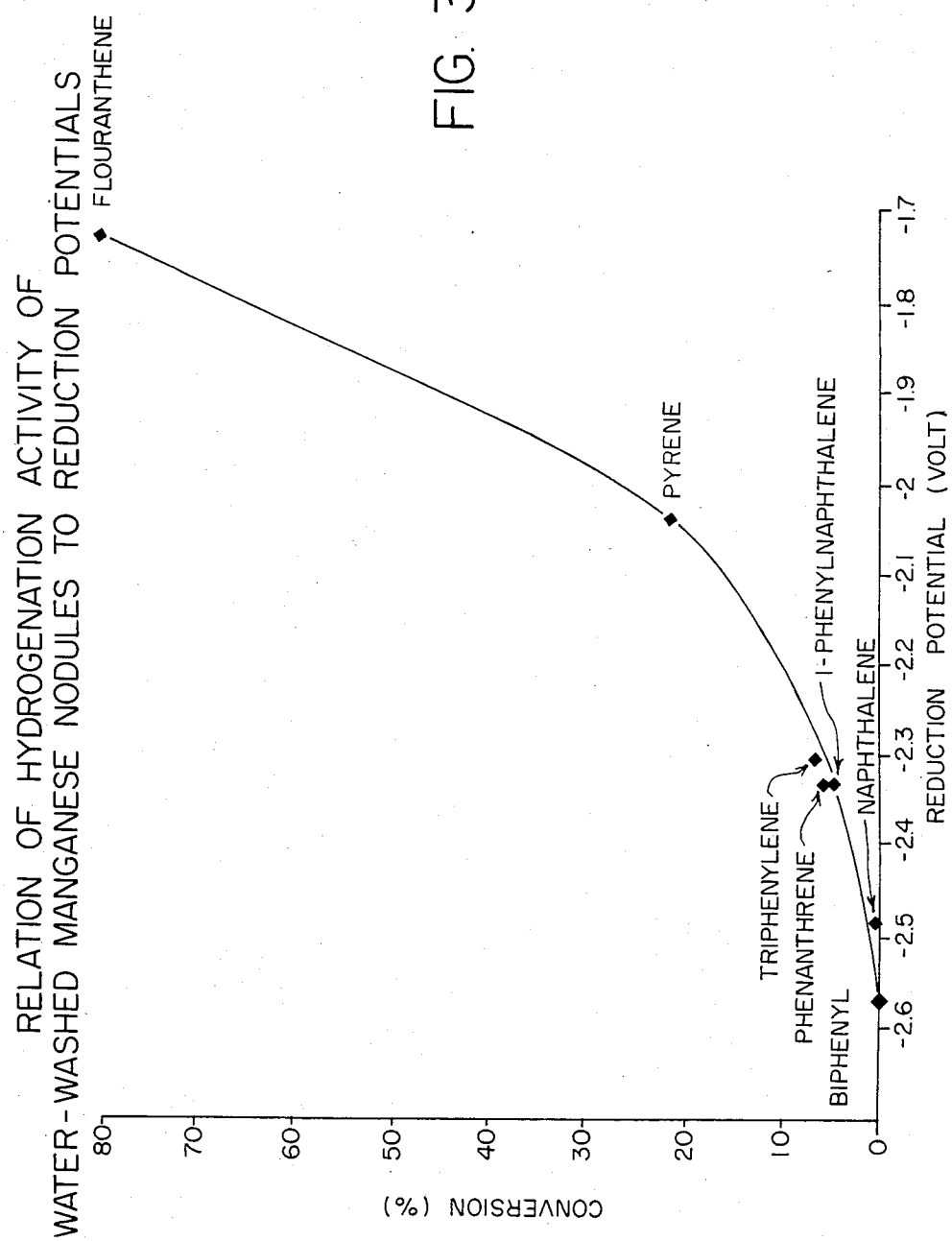

PROCESS FOR SELECTIVELY HYDROGENATING POLYCONDENSED AROMATICS

This invention is concerned with the hydrogenation of heavy hydrocarbon feeds containing polycondensed aromatics. In particular, it is concerned with selectively hydrogenating polycondensed aromatics present in a heavy feed by contacting the feed at elevated temperature in the presence of hydrogen with manganese nodules mineral. The process is particularly useful in providing partially hydrogenated polycondensed aromatics which are highly effective hydrogen donors useful in such processes as hydrogen donor diluent cracking.

Hydrogen donor chemistry is known as a modification of dehydrogenation, wherein hydrogen is transferred from a hydrogen donor compound such as a hydroaromatic to a hydrogen acceptor compound. The ability of a hydrogen donor compound to transfer its hydrogen to an acceptor results from the tendency of the hydroaromatic donor to form materials having a stable dehydrogenated aromatic system. Hydrogen donor chemistry is applied extensively in coal liquefaction as well as in the processing of petroleum residua, tar sands, shale oils, and other heavy feed stocks.

The effect of hydrogen donors in the thermocracking of heavy stocks is well understood and various sources of hydrogen donors have been described. In U.S. Pat. No. 3,238,118, the hydrogen donor for thermocracking of crude still bottoms in the fraction of hydrocracker product boiling above the naphtha range, that is, boiling above about 221° C. (430° F.). That fraction will contain the polycyclic aromatics and hydrogenated polycyclics generated during hydrocracking. U.S. Pat. No. 4,090,947 describes hydrotreating of heavy gas oils, including heavy gas oil from a premium coker, to generate a hydrogen donor diluent stream which is then blended with a fresh charge for thermal cracking. These prior practices involve catalytic hydrogenation of a stream which contains all the components normally present in the fraction to be hydrogenated including nitrogen, metal and sulfur bearing compounds, as well as materials such as asphaltenes which have a high propensity to form coke.

Maganese nodules are known in the art as useful hydrogenation catalysts. For example, U.S. Pat. No. 3,716,479 describes a process for the demetallation of a hydrocarbon charge stock containing metal impurities which involves contacting the hydrocarbon charge stock with hydrogen and with a catalyst comprising managanese nodules. U.S. Pat. No. 4,395,324 relates to a method of producing hydrogenated polynuclear aromatics suitable as hydrogen donors in thermocracking by hydrogenating low boiling aromatics such as napthalene to form low boiling aromatic hydrogen donors such as tetralin and thereafter contacting the latter with high boiling polynuclear aromatic hydrogen acceptors in the presence of manganese nodules and hydrogen.

The present invention provides a process for preparing hydrogenated polynuclear aromatic hydrogen donors employing gaseous hydrogen as a direct source of hydrogen. Polynuclear aromatics for the purposes of the present invention are aromatic compounds having three or more connected aromatic rings such as anthracene, fluoranthene, phenanthrene, and chrysene. When these materials are hydrogenated they become useful as hydrogen donors, particularly in thermal cracking processes wherein high boiling hydrocarbon stocks diluted by such hydrogen donors are cracked in the substantial absence of added cracking catalyst and under hydrogen pressure. Although one- and two-ring aromatic materials such as tetralin from hydrogenation of napthalene, and alkyl-substituted tetralins may be used as hydrogen donors, the relative activity of hydrogen donation from hydroaromatics generally increases with the degree of ring condensation. Accordingly, polycondensed aromatic materials exhibit better hydrogen donation activity than their one- and two-ringed counterparts. Besides their relatively higher activity, the partially hydrogenated polynuclear aromatic hydrogen donors of the present invention exhibit higher boiling points (650°–1000° F.). The higher boiling points of such materials makes them particularly well-suited for hydrogen donor diluent cracking because such processes require recovering the spent hydrogen donors from the reactor effluent. In those situations where a low boiling (350°–650° F.) aromatic hydrogen donor diluent is employed, recovery of the spent donors from the reactor effluent can be difficult because the reactor effluent contains cracked products in the same boiling range as the spent hydrogen donor materials. By employing higher boiling hydrogen donor streams, such as partially hydrogenated polynuclear aromatics, separation of the spent hydrogen donor is relatively simple and complete.

In view of the high cost of hydrogen, hydrogenation of an aromatic stream containing both low boiling and high boiling aromatic compounds capable of functioning as hydrogen donors, would be advantageously carried out by selectively hydrogenating the potential aromatic hydrogen donors. Hydrogen would be most efficiently employed by hydrogenating only those aromatic compounds which when hydrogenated exhibit the greatest activity as hydrogen donors. Accordingly, it would be advantageous to utilize a hydrogenation catalyst which is selective towards hydrogenating polycyclic aromatic compounds while leaving the materials having less potential as hydrogen donors substantially unhydrogenated. Because of the enhanced ability of partially hydrogenated polycylic aromatic compounds to function as hydrogen donors over fully hydrogenated polycyclic aromatic compounds, it is preferable to use a catalyst which can partially hydrogenate polycyclic aromatic compounds.

It has now been found that manganese nodules are particularly effective catalysts in the partial hydrogenation of polynuclear aromatic compounds capable of functioning as hydrogen donors. In accordance with the present invention, partially hydrogenated polynuclear aromatic hydrogen donors are prepared from a hydrocarbon feed comprising polynuclear aromatic hydrogen acceptors, single ring aromatic hydrogen acceptors and double ring aromatic hydrogen acceptors, wherein said polynuclear aromatic hydrogen acceptors are selectively hydrogenated by contacting the feed with hydrogen at elevated temperatures in the presence of manganese nodules.

Manganese nodules are naturally occurring deposits of manganese, along with other metals, including iron, cobalt, nickel, and copper, found in bodies of water. For example, they are found in abundance on the floor of the Atlantic and Pacific Oceans and on the floor of Lake Michigan. The nodules are characterized by a large surface area, i.e. in excess of 150 square meters per gram, and have a wide variety of shapes. For example, ocean nodules often resemble potatoes in size and shape while fresh water nodules such as those from Lake Michigan tend to be smaller in size. Manganese nodules may vary in color from earthy black to brown depending upon their relative manganese and iron content. The nodules are porous and light, having an average specific gravity of about 2.4. Generally, they range from one-eighth inch to 9 inches in diameter but may extend up to approximately 4 feet in length and 3 feet in diameter. Some nodules may weigh as much as 1700 pounds. In addition to the metals mentioned above, the nodules may contain silicon, aluminum, calcium and magnesium, as well as small amounts of molybdenum, zinc, lead, vanadium, and rare earth metals.

The chemical and physical properties of manganese nodules, as catalytic agents for the hydrogenation of certain hydrocarbon charge stocks, compared with conventional catalytic agents for this purpose, are considered to be somewhat unusual. The nodules have a high surface area, about 100–250 square meters per gram. Furthermore, as shown by Roger G. Burns and D. W. Fuerstenau in *American Mineralogist*, Vol. 51, 1966, pages 895–902, "Electron-Probe Determination of Inter-Element Relationships in Manganese Nodules", the concentration of the various metals contained in the nodules, i.e. manganese, iron, cobalt, copper, and nickel, may vary considerably throughout the crystalline structure of the nodule. In other words, a transverse section of a nodule exhibits marked differences in the concentration of the various metals from point to point of the traverse.

The process of the present invention may be used with any hydrocarbon charge which contains polynuclear aromatics. Such aromatics, including pyrene, fluoranthene, anthracene, benzanthracene, perylene, coronene and their lower alkyl analogs may be found in heavy hydrocarbon charge stocks such as whole or topped crude, atmospheric or vacuum residua, heavy coker gas oil, clarified slurry oil, shale oil, tar sand extract, or coal liquefaction products. The polynuclear aromatics are highly susceptible to coking during hydrocarbon conversion processes. Accordingly, one sigificant benefit of the hydrogenation process of the present invention is that it reduces susceptibility of such polynuclear aromatics materials to coking. Furthermore, the partially hydrogenated products of the present invention exhibit weaker carbon to carbon bonds than their dehydrogenated aromatic precursors and hence can be more easily cracked.

The feed of the present invention may contain in addition to polynuclear aromatics, the lower boiling aromatic hydrogen acceptors such as naphtalene, as well as nitrogen-and/or sulfur-containing compounds, e.g. the benzoquinolines. The present invention is well-suited to selectively and partially hydrogenating polynuclear aromatics in the presence of these other feed components. It is particularly useful because manganese nodules have been found to have a high activity for hydrogenation of polynuclear aromatics even in the presence of compounds containing nitrogen or sulfur.

In the process of the present invention, the polynuclear aromatic-containing hydrocarbon charge stock is contacted with a manganese nodules catalyst in the presence of hydrogen. Temperatures at which the contacting is conducted may range from about 250° to 500° C. (482° to 932° F.), preferably about 300° to 400° C. (572° to 752° F.), say about 343° C. (650° F.). The pressures at which the partial hydrogenation is carried out can range from about 300 to 3000 psig. Preferably, the pressures employed are in the range of 1000 to 1800 psig, say about 1400 psig. Where the reaction is carried out by passing the hydrocarbon charge stock through a bed of the catalyst, the liquid hourly space velocity (LHSV) of the charge stock can be from about 0.1 to 20, preferably about 1 to 10 volumes of charge per volume of catalyst per hour, say about 4. The hydrogen to feed volume ratio may range from about 100 to 4000, preferably about 400 to 2500, say about 1000. The hydrocarbon chargestock along with the hydrogen may be passed upwardly through a fixed bed of the catalyst in an upflow reactor or may be passed downwardly through a fixed bed of the catalyst in a downflow trickle-bed reactor. The reaction may also be conducted by passing the charge stock in the gas to an ebullient bed of the catalyst. The reaction may also be conducted in a batch type reactor such as an autoclave.

The manganese nodules, appropriately sized to 1 to 400 mesh, preferably 20 to 80 mesh by conventional methods, can be employed as the catalyst for the hydrogenation or partial hydrogenation of the hydrocarbon charge stock substantially as mined, or recovered, from the floor of the body of water in which they occured. Thus, the nodules, as mined, preferably after washing to remove sea water or lake water therefrom and mud or other loose material from their surface, may be employed for the partial hydrogenation of polynuclear aromatics. Washing can be performed with water, preferably at a temperature of about 100° C. (220° F.).

The manganese nodules employed herein may have surface areas ranging from about 40 to 350 m$^2$/g, preferably about 150 to 250 m$^2$/g, particle densities ranging from about 0.7 to 3.0 g/cc, preferably from about 1.1 to 1.6 g/cc, pore diameters ranging from about 50 to 1000 A, preferably about 60 to 200 A, pore volumes ranging from about 0.3 to 1.2 cc/g, preferably about 0.35 to 0.55 cc/g and real densities ranging from about 2.5 to 4.5 g/cc, preferably about 3.0 to 3.8 g/cc.

It has been found that the manganese nodules of the present invention are highly selective for hydrogenating the aromatic hydrocarbons of higher (less negative) reduction peak potential (Ep) for first reduction wave determined by conventional polarographic techniques. Although conventional Co/Mo hydrogenation catalysts exhibit such selectivity as well, manganese nodules exhibit significantly greater hydrogenation activity with aromatic compounds of high reduction potential, e.g., the polynuclear aromatic hydrogen acceptors, fluoranthene and pyrene, relative to the conventional catalyst. Surprisingly, the nodules exhibit reduced hydrogenation activity relative to the conventional catalyst, for aromatic compounds of lower reduction potential such as the double ring aromatic hydrogen acceptors, biphenyl and naphthalene.

The hydrogenation reaction may also be carried out employing, as the catalyst, manganese nodules which have been subjected to a pretreatment. Pretreatments to which the manganese nodules may be subjected include sulfiding or leaching to remove therefrom one or more components of the nodules. However, it has been found that presulfided treatment leads to lower selectivity compared with nodules which are simply hot water-washed.

BRIEF DESCRIPTION OF THE DRAWING

FIGS. 1 and 2 are graphs showing ageing of the hydrogenatiiong activities of manganese nodules.

FIG. 3 is a graph showing relation of hydrogenation activity of water-washed manganese nodules to reduction potentials.

The above-described invention will now be illustrated by examples which are not to be interpreted as limiting the invention. All parts and proportions given in the examples are to be understood as based on weight unless explicitly stated to be otherwise.

EXAMPLE 1

A model compound mixture was prepared containing 59% of mesitylene, 1% of thiophene, 5% of indole, 5% of quinoline, 10% of naphthalene, 10% of phenanthrene and 10% of pyrene. The aromatic mixture was contacted with hydrogen and a catalyst comprising manganese nodules which were prepared by hot water washing. The mixture was then exposed to the following conditions for about 48 hours: 343° C. (650° F.), 1400 psig $H_2$, $H_2$/feed volume ratio of 1000 and an LHSV of 4 per hour. FIG. 1 shows the aging curves of hydrogenation activity relative to the conversion of pyrene, a highly condensed aromatic, for hot water-washed (fresh) manganese nodules, presulfided manganese nodules, a commercial Co-Mo hydrotreating catalyst (HDS-1442 available from American Cyanamid) as well as a Vycor catalyst.

FIG. 1 indicates that within about the first 15 hours, hot water-washed manganese nodules hydrogenated more pyrene than the commercial hydrotreating catalyst. FIG. 1 further shows the enhanced effect of treating nitrogen-containing feeds containing sulfur with the catalyst of the present invention compared with a feed containing only nitrogen impurities. In addition, FIG. 1 indicates that hot water-washed manganese nodules exhibit greater hydrogenation activity for highly condensed aromatics such as pyrene than do their presulfided counterparts.

FIG. 2 compares the hydrogenation activity of hot water washed nodules with that of the Co-Mo hydrotreating catalyst relative to pyrene, phenanthrene and naphthalene conversion. The manganese nodules exhibit greater hydrogenation activity for highly condensed pyrene aromatic and decreased hydrogenation activity for lesser condensed phenanthrene and naphthalene, relative to the Co-Mo catalyst. Table 1 shows a comparison of the initial hydrogenation selectivity between the manganese nodules and HDS-1442.

TABLE 1

| HYDROGENATION SELECTIVITY FOR AROMATICS | | |
|---|---|---|
| Catalyst | % Pyrene Conversion / % Naphthalene Conversion | % Phenanthrene Conversion / % Naphthalene Conversion |
| Nodules | 24.5 | 6.9 |
| HDS-1442 | 2.0 | 1.1 |

EXAMPLE 2

Seven runs were conducted with the hot water washed manganese nodules of the present invention to compare its hydrogenation activity with respect to a series of seven aromatic hydrocarbons of increasing reduction peak potentials Ep (vs saturated Calomel reference electrode): biphenyl ($-2.57$ volts); naphthalene ($-2.49$ volts); phenanthrene ($-2.43$ volts); 1-phenylnaphthalene ($-2.43$ volts); triphenylene ($-2.41$ volts); pyrene ($-2.04$ volts); and fluoranthene ($-1.74$ volts). The hydrogenation was carried out at about 343° C. (650° F.) at an LHSV of about 4 at 1400 psi $H_2$ for about 2.5 hours. Percent conversion increased with increasing reduction potentials as indicated by FIG. 3. The manganese nodule catalyst was particularly effective at potentials of $-2.04$ volts or more, thus indicating that the catalyst of the present invention selectively hydrogenates hydrogen acceptors of higher reduction potentials (less negative) over hydrogen acceptors of lower reduction potential (more negative).

It is claimed:

1. A process for preparing hydrogenated or partially hydrogenated polynuclear aromatic hydrogen donors from a hydrocarbon feed comprising polynuclear aromatic hydrogen acceptors, single ring aromatic hydrogen acceptors and double ring aromatic hydrogen acceptors, wherein said polynuclear aromatics are selectively hydrogenated by contacting said feed with hydrogen in the presence of maganese nodules.

2. The process of claim 1 wherein said selective hydrogenation occurs in the presence of nitrogen- and sulfur-containing compounds.

3. The process of claim 1 wherein said selective hydrogenation occurs at temperatures ranging from about 250° to 500° C., pressures ranging from about 300 to 3000 psig, $H_2$/feed volume ratios ranging from about 100 to 4000 and a space velocity of 0.1 to 20 LHSV.

4. The process of claim 3 wherein said selective hydrogenation occurs at temperatures ranging from about 300° to 400° C., pressures ranging from about 1000 to 1800 psig, $H_2$/feed volume ratios ranging from about 400 to 2500 and a space velocity of 1 to 10 LHSV.

5. The process of claim 1 wherein said manganese nodules have surface areas ranging from about 40 to 350 $m^2/g$, particle densities ranging from about 0.7 to 3.0 g/cc, pore diameters ranging from about 50 to 1000 A, pore volumes ranging from about 0.3 to 1.2 cc/g, real densities ranging from about 2.5 to 4.5 g/cc and particle sizes ranging from about 1 to 400 mesh.

6. The process of claim 5 wherein said manganese nodules have surface areas ranging from about 150 to 250 $m^2/g$, particle densities ranging from about 1.1 to 1.6 g/cc, pore diameters ranging from about 60 to 200 A, pore volumes ranging from about 0.35 to 0.55 cc/g, real densities ranging from about 3.0 to 3.8 g/cc and particle sizes ranging from about 20 to 80 mesh.

7. A process for converting a hydrocarbon feed comprising polynuclear aromatic hydrogen acceptors, single ring aromatic hydrogen acceptors and double ring aromatic hydrogen acceptors, wherein hydrogen acceptors of increased reduction potential (Ep) are selectively hydrogenated relative to hydrogen acceptors of reduced reduction potential, said feed being contacted with hydrogen in the presence of manganese nodules.

8. The process of claim 7 wherein said selective hydrogenation occurs in the presence of nitrogen- and sulfur-containing compounds.

9. The process of claim 7 wherein said selective hydrogenation occurs at temperatures ranging from about 250° to 500° C., pressures ranging from about 300 to 3000 psig, $H_2$/feed volume ratios ranging from about 100 to 4000 and a space velocity of 0.1 to 20 LHSV.

10. The process of claim 7 wherein said selective hydrogenation occurs at temperatures ranging from about 300° to 400° C., pressures ranging from about 1000 to 1800 psig, $H_2$/feed volume ratios ranging from about 400 to 2500, and a space velocity of 1 to 10 LHSV.

11. The process of claim 7 wherein said manganese nodules have surface areas ranging from about 40 to 350 m²/g, particle densities ranging from about 0.7 to 3.0 g/cc, pore diameters ranging from about 50 to 1000 A, pore volumes ranging from about 0.3 to 1.2 cc/g, real densities ranging from about 2.5 to 4.5 g/cc and particle sizes ranging from about 1 to 400 mesh.

12. The process of claim 11 wherein said manganese nodules have surface areas ranging from about 150 to 250 m²/g, particle densities ranging from about 1.1 to 1.6 g/cc, pore diameters ranging from about 60 to 200 A, pore volumes ranging from about 0.35 to 0.55 cc/g, real densities ranging from about 3.0 to 3.8 g/cc and particle sizes ranging from about 20 to 80 mesh.

* * * * *